Figure 1:
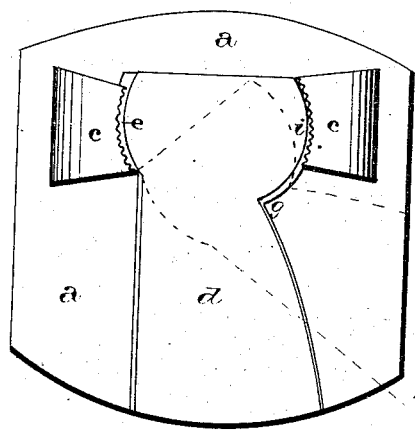
Figure 2:
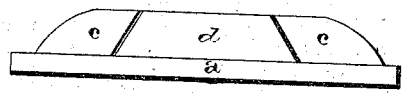

E. EVANS.
Stove-Legs.

No. 152,795.

Patented July 7, 1874.

WITNESSES.
F. B. Townsend.
J. Wm. Farner.

INVENTOR.
Elijah Evans
per
F. A. Lehmann, Atty.

UNITED STATES PATENT OFFICE.

ELIJAH EVANS, OF SPARTA, ASSIGNOR OF ONE-HALF TO ABNER D. ELLIOTT, OF DELAWARE, OHIO.

IMPROVEMENT IN STOVE-LEGS.

Specification forming part of Letters Patent No. 152,795, dated July 7, 1874; application filed June 8, 1874.

*To all whom it may concern:*

Be it known that I, ELIJAH EVANS, of Sparta, in the county of Morrow and State of Ohio, have invented certain new and useful Improvements in Stove-Legs; and I do hereby declare the following to be a full, clear, and exact description of the invention, such as will enable others skilled in the art to which it pertains to make use of it, reference being had to the accompanying drawings, which form part of this specification.

The nature of my invention relates to an improvement in stove-legs; and it consists in forming two convex surfaces, of unequal size, on the opposite edges of the shank of each of the stove-legs, and a notch or depression in one side, and forming lugs or projections, having inwardly-beveled serrated sides, on the bottom plate of the stove, and between which lugs the shank of the leg is inserted.

The accompanying drawings represent my invention.

$a$ represents the bottom plate of the stove, upon which are cast the lugs or projections $c$, the inner sides of which are curved, serrated, and beveled from their lower edges upward. The upper inner end of the stove-leg $d$ has its two sides beveled downward, and is made slightly rounding at $e$. Upon the opposite side is formed a recess, $g$, and just opposite the curve $e$ is formed a larger circle or curve, $i$, these two curves corresponding to curve formed in the inner sides of the lugs. In order to insert the end of the leg between the two lugs, the leg has to be turned partly around until the inner point of the lug comes in the recess $g$, when the leg is swung around into a straight line, forcing the two curves in between the lugs, where they are caught and held by the serrated sides. The two curves are so formed that the end of the leg cannot be drawn out by a straight pull, but the leg has again to be swung around into its entering position, when it is drawn out sidewise.

By means of this simple device the legs can be quickly inserted into and removed from position, and yet are so securely held that no strain or movement of the stove can displace them.

I am aware that stove-legs, having a raised surface or projection cast upon its top with beveled rounding ends, and a circular continuous socket on the bottom plate of the stove, are not new, and I do not desire to claim such. My invention consists in forming the two convex edges of unequal size, and the notch directly upon and in the shank or flange of the leg itself, so that the lugs $c$ instead of a continuous socket can be used.

Having thus described my invention, I claim—

The combination of the shank $d$ of the leg, having the two convex surfaces $e\ i$, of unequal size, formed upon its two opposite edges, and a depression, $g$, formed in its side to allow the leg to be swung around for insertion or removal, with the bottom plate $a$, having the two recessed projections $c$, between which the shank of the leg engages and is held, substantially as shown and described.

In testimony that I claim the foregoing, I have hereunto set my hand this 1st day of June, 1874.

ELIJAH EVANS.

Witnesses:
EUGENE BLISS,
OREN CARTER.